United States Patent
Lutz et al.

(10) Patent No.: US 8,015,231 B2
(45) Date of Patent: *Sep. 6, 2011

(54) DATA PROCESSING APPARATUS AND METHOD FOR PERFORMING FLOATING POINT MULTIPLICATION

(75) Inventors: David Raymond Lutz, Austin, TX (US); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 2089 days.

This patent is subject to a terminal disclaimer.

(21) Appl. No.: 10/999,154

(22) Filed: Nov. 30, 2004

(65) Prior Publication Data
US 2006/0117080 A1    Jun. 1, 2006

(51) Int. Cl.
*G06F 7/52* (2006.01)
(52) U.S. Cl. .................... 708/620; 708/495; 708/498
(58) Field of Classification Search ........... 708/622–630
See application file for complete search history.

(56) References Cited

U.S. PATENT DOCUMENTS

| | | | |
|---|---|---|---|
| 5,553,015 A | 9/1996 | Elliott | |
| 5,729,485 A * | 3/1998 | Wolrich et al. | 708/620 |
| 6,353,843 B1 * | 3/2002 | Chehrazi et al. | 708/631 |
| 6,366,942 B1 | 4/2002 | Badeau et al. | 708/497 |

OTHER PUBLICATIONS

D. Lutz et al, "Early Zero Detection" Proceedings of the 1996 International Conference on Computer Design (ICCD '96), 1996, pp. 545-550.

* cited by examiner

*Primary Examiner* — Lewis A Bullock, Jr.
*Assistant Examiner* — Michael Yaary
(74) *Attorney, Agent, or Firm* — Nixon & Vanderhye P.C.

(57) ABSTRACT

A data processing apparatus and method includes multiplier logic operable to multiply the first and second n-bit significands to produce a pair of 2n-bit vectors. Half adder logic is arranged to produce a plurality of carry and sum bits representing a corresponding plurality of most significant bits of the pair of 2n-bit vectors. The first adder logic then performs a first sum operation with a first rounded result and a second adder logic performs a second sum operation with a second rounded result. The required n-bit result is then derived from either the first rounded result or the second rounded result. The data processing apparatus takes advantage of a property of the half adder form to enable a rounding increment value to be injected prior to performance of the first and second sum operations without requiring full adders to be used to inject the rounding increment value.

18 Claims, 5 Drawing Sheets

DATA PROCESSING APPARATUS AND METHOD FOR PERFORMING FLOATING POINT MULTIPLICATION

BACKGROUND OF THE INVENTION

1. Field of the Invention

The present invention relates to a data processing apparatus and methods for performing floating point multiplication, and in particular to a data processing apparatus and method for multiplying first and second n-bit significands of first and second floating point operands to produce an n-bit result.

2. Description of the Prior Art

A floating point number can be expresses as follows:

$$\pm 1.x * 2^y$$

where: x=fraction 1.x=significand (also known as the mantissa)

y=exponent

Figure 1:
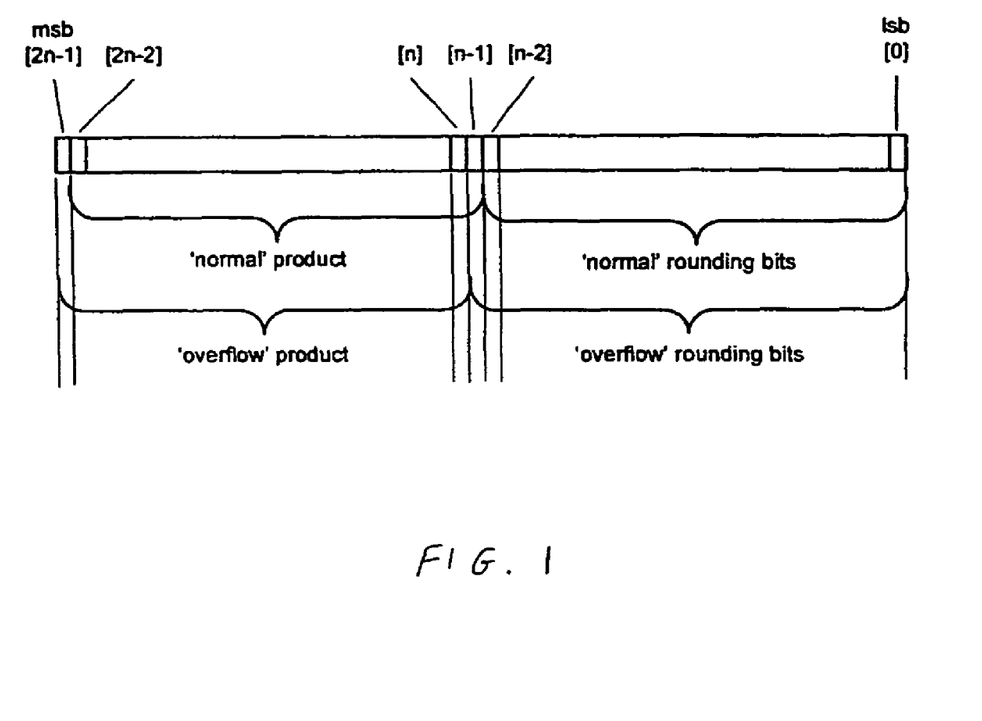
FIG. 1 is a diagram schematically illustrating products that can be produced when multiplying first and second n-bit significands of first and second floating point operands, along with an indication of the bits used for rounding.

Floating-point multiplication consists of several steps:

1. Evaluating the input operands for special cases (in particular NaNs (Not-a-Number cases), infinities, zeros, and in some implementations subnormals). If a special case is detected, other processing may be required in place of the sequence below.
2. Adding the exponents. The product exponent is the sum of the multiplicand and multiplier exponents. The product exponent is checked for out of range conditions. If the exponent is out of range, a resulted is forced, and the sequence of steps below is not necessary.
3. The fractions are converted to significands. If the input operand was normal (as opposed to NaN, infinity, zero or subnormal) a leading '1' is prepended to the fraction to make the significand. If the input operand is subnormal, a '0' is prepended instead. Note that in alternative systems the subnormal operand may instead be normalized in an operand space larger than the input precision. For example, single-precision numbers have 8 bits of exponent, but an internal precision may choose to have 9 or more bits for the exponent, allowing single-precision subnormal operands to be normalized in such a system.
4. The n-bit significands are multiplied to produce a redundant set of 2n-bit vectors representing the 2n-bit product. This is typically done in an array of small adders and compressors.
5. The two 2n-bit vectors are summed to form a non-redundant final product of 2n-bits in length.
6. This final product is evaluated for rounding. The final result may only be n-bits. The lower bits contribute only to the rounding computation. If the computed product has the most significant bit set it is said to have 'overflowed' the significand. In this case, as illustrated in FIG. 1, the upper n-bits representing the product begin with the most significant bit, whilst the lower n-bits are used in the rounding computation. If the most significant bit of the product is not set, the resulting product (represented by bits 2n−2 to n−1) is considered 'normal' and the n−1 least significant bits (bits 0 to n−2) contribute to rounding.
7. The n-bits of the final product are selected. If the computed product has overflowed, bits [2n−1:n] are selected, whilst if the computed product is normal, bits [2n−2:n−1] are selected. The rounding bits corresponding to the normal or overflowed product are evaluated and a decision is made as to whether it is necessary to increment the final product.
8. If the final n-bit product is to be incremented, a '1' is added to the final product at the least significant point (i.e. bit 0 of the final product).
9. The rounded final product is evaluated for overflow. This condition occurs when the final product was composed of all ones, and the rounding increment caused the final product to generate a carry into bit n (i.e. a bit position immediately to the left of the most significant bit (bit n−1) of the final product), effectively overflowing the n-bits of the result, and requiring a single bit shift right and an increment of the exponent.

The above series of steps are inherently serial, but can be parallelised at several points. For example, it would be desirable to seek to perform the rounding evaluation and any necessary rounding increment without having to first wait for the final product to be produced.

U.S. Pat. No. 6,366,942-B1 describes a technique for rounding floating point results in a digital processing system. The apparatus accepts two floating point numbers as operands in order to perform addition, and includes a rounding adder circuit which can accept the operands and a rounding increment bit at various bit positions. The circuit uses full adders at required bit positions to accommodate a bit from each operand and the rounding bit. Since the proper position in which the rounding bit should be injected into the addition may be unknown at the start, respective low and high increment bit addition circuits are provided to compute a result for both the low and a high increment rounding bit condition. The final result is selected based upon the most significant bit of the low increment-rounding bit result. The low and high increment bit addition circuits can share a high order bit addition circuit for those high order bits where a rounding increment is not required, with this single high order bit addition circuit including half adders coupled in sequence, with one half adder per high order bit position of the first and second operands.

Hence, it can be seen that U.S. Pat. No. 6,366,942-B1 teaches a technique which enables the rounding process to be performed before the final product is produced, but in order to do this requires the use of full adders (i.e. adders that take three input bits and produce at their output a carry and a sum bit) at any bit positions where a rounding bit is to be injected.

Full adders typically take twice as long to generate output carry and sum bits as do half adders. As there is a general desire to perform data processing operations more and more quickly, this tends to lead to a reduction in the clock period (also referred to herein as the cycle time) within the data processing apparatus. As the cycle time reduces, the delays incurred through the use of the full adders described above are likely to become unacceptable.

SUMMARY OF THE INVENTION

Viewed from a first aspect, the present invention provides a data processing apparatus for multiplying first and second n-bit significands of first and second floating point operands to produce an n-bit result, the data processing apparatus comprising: multiplier logic operable to multiply the first and second n-bit significands to produce a pair of 2n-bit vectors; half adder logic operable to receive a plurality of most significant bits of the pair of 2n-bit vectors and to produce a corresponding plurality of carry and sum bits representing those plurality of most significant bits; first adder logic operable to perform a first sum operation in order to generate a first rounded result equivalent to the addition of the pair of 2n-bit vectors with a rounding increment injected at a first predetermined rounding position appropriate for a non-overflow condition, the first adder logic being operable to use as the m most significant bits of the pair of 2n-bit vectors the corresponding m carry and sum bits, the least significant of the m carry bits being replaced with a rounding increment value prior to the first adder logic performing the first sum operation; second adder logic operable to perform a second sum operation in order to generate a second rounded result equivalent to the addition of the pair of 2n-bit vectors with a rounding increment injected at a second predetermined rounding position appropriate for an overflow condition, the second adder logic being operable to use as the m−1 most significant bits of the pair of 2n-bit vectors the corresponding m−1 carry and sum bits, the least significant of the m−1 carry bits being replaced with the rounding increment value prior to the second adder logic performing the second sum operation; and selector logic operable to derive the n-bit result from either the first rounded result or the second rounded result.

In accordance with the present invention, half adder logic is provided to produce a plurality of carry and sum bits representing a corresponding plurality of most significant bits of a pair of 2n-bit vectors produced by multiplier logic. First adder logic then performs a first sum operation using m carry and sum bits produced by the half adder logic as the m most significant bits of the pair of 2n-bit vectors to be summed. The remaining bits are taken directly from the 2n-bit vectors. By taking advantage of the half adder form, the least significant of the m carry bits can be replaced with a rounding increment value prior to the first adder logic performing the first sum operation, so that the first sum operation generates a first rounded result equivalent to the addition of the pair of 2n-bit vectors with a rounding increment injected at a first predetermined rounding position appropriate for a non-overflow condition.

Second adder logic is provided to perform a second sum operation, which is similar to the first sum operation, but with the rounding increment injected at a second predetermined rounding position appropriate for an overflow condition. With this in mind, the second adder logic uses as the m−1 most significant bits of the pair of 2n-bit vectors the corresponding m−1 carry and sum bits, and again the remaining bits are provided directly by the 2n-bit vectors. The least significant of the m−1 carry bits is then replaced with the rounding increment value prior to the second sum operation being performed.

Once the first and second sum operations have been performed, the required n-bit result can be derived from either the first rounded result or the second rounded result.

Hence, in accordance with the present invention, a very efficient technique is provided for incorporating the necessary rounding prior to the summation of the 2n-bit vectors, with the properties of the half adder form being exploited to enable a rounding increment value to be injected without the requirement for a full adder.

The selector logic may be arranged in a variety of ways. However, in one embodiment, the selector logic includes overflow detection logic operable to detect the presence of the overflow condition with reference to the most significant bit of the first rounded result, if the overflow condition exists the selector logic being operable to derive the n-bit result from the second rounded result, and if the overflow condition does not exist the selector logic being operable to derive the n-bit result from the first rounded result. In particular, if the most significant bit of the first rounded result is set, this will indicate the presence of the overflow condition, whereas if the most significant bit of the first rounded result is not set, this will indicate that the overflow condition does not exist.

A number of different rounding modes exist identifying how values should be rounded in particular situations. In accordance with one embodiment of the present invention, the n-bit result is required to be rounded in accordance with a round-to-nearest rounding mode, the selector logic including correction logic operable to detect a situation where the n-bit result derived from the first rounded result or the second rounded result does not conform to the round-to-nearest rounding mode and to correct the n-bit result by manipulation of one or more bits of the n-bit result. In accordance with the round-to-nearest rounding mode, also referred to as the "Round-to-Nearest-Even" (RNE) rounding mode, values that are more than half way between two representable results are rounded up, whilst values that are less than half way between two representable results are rounded down (or truncated). Values that are exactly half way between two representable results are rounded to a final result that has a least significant fraction bit equal to zero, thus making the result even.

In one embodiment of the present invention, it has been found that the correction logic merely needs to reset the least significant bit of the n-bit result to zero if the derived n-bit result does not conform to the round-to-nearest rounding mode.

In one embodiment, the first predetermined rounding position is a guard bit position assuming the non-overflow condition exists and the second predetermined rounding position is a guard bit position assuming the overflow condition exists. The guard bit position is the bit position immediately to the right of the least significant bit of the n-bit result. Hence, the insertion of the rounding increment value at the guard bit position results in an addition of ½ ULP (Unit in the Lowest Place) to the result.

When determining whether rounding is appropriate, it is usual to assess-all of the bits of the 2n-bit result to the right of the guard bit position to determine whether any of those bits are set. If any of those bits are set, then a sticky bit value is set, whereas if all of the bits are not set, then the sticky bit value is not set. The sticky bit can then be used along with the least significant bit and the guard bit of the result to determine whether rounding should take place or not. However, if it is necessary to await the production of the 2n-bit final result before calculating the sticky bit value, then it is clear that a final determination as to whether rounding should take place or not will be delayed awaiting the generation of the sticky bit. In one embodiment of the present invention, this delay is overcome through the provision of sticky bit generation logic operable to determine from a number of least significant bits of the pair of 2n-bit vectors a first sticky value associated with the first rounded result and a second sticky value associated with the second rounded result. In accordance with this embodiment, the first and second sticky values are produced using the pair of 2n-bit vectors, hence avoiding the need to await for the 2n-bit result to be produced. The sticky bit generation logic takes advantage of properties of the half adder form in order to determine whether the first and second sticky values should be set or not.

In one embodiment, the first and second sticky values produced by the sticky bit generation logic are then input to the correction logic used to correct the n-bit result if non-compliance with the round-to-nearest rounding mode is detected.

In one particular embodiment, the situation where the n-bit result does not conform to the round-to-nearest rounding mode is determined to occur when the least significant bit of the n-bit result is set but the guard bit position of the rounded result from which the n-bit result is derived and the associated sticky value are both not set, upon determination of the occurrence of said situation, the correction logic being operable to cause the least significant bit of the n-bit result to be cleared in order to correct the n-bit result. This situation represents the "tie case" where the equivalent unrounded result would have been half way between two representable values and in that situation compliance with the RNE rounding mode requires that the value is rounded to an even value. Accordingly, the least significant bit should be a logic zero value rather than a logic one value. In this particular situation, the error introduced by the forced rounding increment value at the guard position does not propagate beyond the least significant bit position, and accordingly the result can be corrected merely by resetting the least significant bit position to a zero.

The present invention may be applied to any format of floating point operands, for example single precision or double precision floating point operands. However, in one embodiment, the first and second floating point operands are single precision floating point operands, n is 24 and m is 26.

Hence, in this embodiment, the first adder logic uses as the 26 most significant bits of the 2n-bit vectors the corresponding 26 most significant carry and sum values produced by the half adder logic. Similarly, the second adder logic uses as the 25 most significant bits of the 2n-bit vectors the 25 most significant bits of the carry and sum values produced by the half adder logic. However, whilst in one embodiment of the present invention the most significant bit of the first rounded result needs to be produced in order to assess whether the overflow condition exists or not, the most significant bit of the second rounded result need not be produced, since the second rounded result will only be used if the overflow condition exists, and in that instance it is known that the most significant bit will have a logic one value. Accordingly, in one embodiment, the second adder logic ignores the most significant carry bit and sum bit when performing the second sum operation. Hence, whilst the second adder logic still uses as the 25 most significant bits of the 2n-bit vectors the 25 most significant bits of the carry and sum vectors produced by the half adder logic, it actually makes no use of the most significant carry bit and most significant sum bit when performing the second sum operation.

Viewed from a second aspect, the present invention provides a method of operating a data processing apparatus to multiply first and second n-bit significands of first and second floating point operands to produce an n-bit result, the method comprising the steps of: multiplying the first and second n-bit significands to produce a pair of 2n-bit vectors; employing half adder logic to produce from a plurality of most significant bits of the pair of 2n-bit vectors a corresponding plurality of carry and sum bits representing those plurality of most significant bits; performing a first sum operation in order to generate a first rounded result equivalent to the addition of the pair of 2n-bit vectors with a rounding increment injected at a first predetermined rounding position appropriate for a non-overflow condition, the first sum operation using as the m most significant bits of the pair of 2n-bit vectors the corresponding m carry and sum bits, the least significant of the m carry bits being replaced with a rounding increment value prior to performing the first sum operation; performing a second sum operation in order to generate a second rounded result equivalent to the addition of the pair of 2n-bit vectors with a rounding increment injected at a second predetermined rounding position appropriate for an overflow condition, the second sum operation using as the m−1 most significant bits of the pair of 2n-bit vectors the corresponding m−1 carry and sum bits, the least significant of the m−1 carry bits being replaced with the rounding increment value prior to performing the second sum operation; and deriving the n-bit result from either the first rounded result or the second rounded result.

BRIEF DESCRIPTION OF THE DRAWINGS

The present invention will be described further, by way of example only, with reference to an embodiment thereof as illustrated in the accompanying drawings, in which.

DESCRIPTION OF EMBODIMENTS

Figure 2:
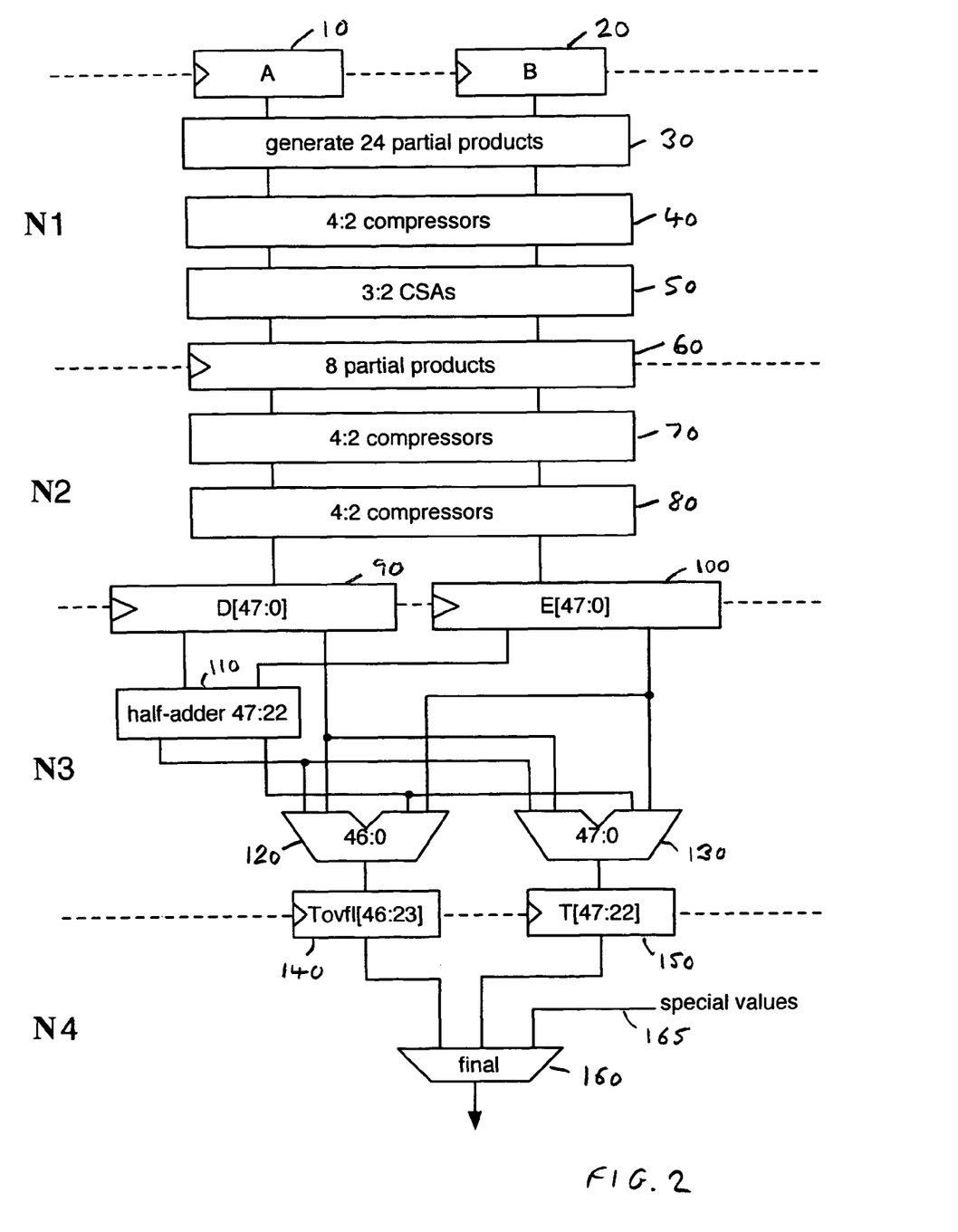
FIG. 2 is a block diagram of logic provided within a data processing apparatus in accordance with one embodiment of the present invention to produce an n-bit result when multiplying two n-bit significands of two floating point operands.

FIG. 2 is a block diagram illustrating logic provided within a data processing apparatus of one embodiment of the present invention to multiply first and second n-bit significands of two floating point operands in order to produce an n-bit final result. For the sake of illustration, it is assumed that the input operands are single precision floating point operands, and accordingly each operand consists of a 1-bit sign value, an 8-bit exponent value and a 23-bit fraction value. The 23-bit fraction value will be converted into a 24-bit significand and the 24-bit significands from both floating point operands will be provided to the registers 10, 20, respectively.

As shown in FIG. 2, the multiplier has a 4-stage pipeline. Most of the fourth stage is used for forwarding, hence for example allowing the multiplier result to be forwarded to a separate addition pipeline in order to enable multiply-accumulate operations to be performed. Given that most of the fourth stage is used for forwarding, the bulk of the multiplication logic is provided in the first three stages.

The first two stages, N1 and N2, employ an array of small adders and compressors in order to multiply the two n-bit significands so as to produce a redundant pair of 2n-bit vectors representing the 2n-bit product. In particular, partial product generation logic 30 is provided to generate from the two 24-bit input significands 24 partial products, after which a set of 4:2 compressors 40 and 3:2 carry-save adders (CSAs) 50 are used to reduce the 24 partial products to 8 partial products, which are latched in the registers 60 at the end of stage N1. In stage N2, further sets of 4:2 compressors 70 and 4:2 compressors 80 are used to reduce the 8 partial products down to two 48-bit vectors D and E, vector D being stored in register 90 and vector E being stored in register 100 at the end of stage N2.

Since most of stage 4 is required for forwarding, stage 3 is required to do most of the processing required to produce a rounded result. In accordance with embodiments of the present invention, this is achieved through the use of half adder logic 110 which is arranged to perform a half adder operation on a bits 47 to 22 of vectors D and E, with two carry-propagate adders 120 and 130 then being arranged to perform two separate additions of the vectors D and E using as a certain number of most significant bits of the vectors D and E the carry and sum values output by the half adder logic 110 whilst for the remainder of the bits using the actual values of the vectors D and E stored within the registers 90 and 100.

As will be appreciated from the earlier discussion of FIG. 1, the least significant bit of the final n-bit result will be dependent on whether the product has overflowed or not. In accordance with embodiments of the present invention, rounding is performed by inserting a 1 at the bit position immediately to the right of the least significant bit, this bit position being referred to as the guard bit position. This insertion of a 1 hence causes ½ ULP (Unit in the Lowest Place) to be added to the result. The following table illustrates the bit position at which such a rounding increment must be added for both the no overflow and overflow cases:

TABLE 1

| Case | Significant bits | Rounding Location (G) | Sticky bits |
|---|---|---|---|
| No overflow | 46:23 | 22 | 21:0 |
| Overflow | 47:24 | 23 | 22:0 |

Accordingly, for the no overflow condition, it can be seen that a 1 needs to injected at bit position 22, whereas for an overflow condition a 1 needs to be injected at bit position 23. As will be shown later with reference to a discussion of the half adder form, the least significant carry bit produced by a half adder will always be zero, and accordingly a 1 can readily be inserted at that bit position. As will be discussed in more detail with reference to FIG. 3, this fact is used to enable a 1 to be injected at bit position 22 of a first input to the adder 130, and to enable a 1 to be injected at bit position 23 of a first input to the adder 120, this resulting in the adder 130 producing a rounded result for the no overflow case, whilst the adder 120 produces a rounded result for the overflow case.

As shown in FIG. 2, register 140 is arranged to register bits 46 to 23 output by the adder 120. With reference to the earlier table 1, it can be seen that the n-bit result for the overflow condition is actually given by bits 47 to 24. However, it will be appreciated that if the overflow result is selected, this is done on the basis that bit 47 is set to a one, and accordingly there is no need to latch bit 47 in the register 140. Bit 23 (i.e. the guard bit for the overflow case) is latched in register 140, since, as will be discussed in more detail later with reference to FIG. 4, this information is required in stage N4 when determining whether any correction is required to the least significant bit of the result.

As also shown in FIG. 2, register 150 latches bits 47 to 22 of the result produced by adder 130. With reference to the earlier table 1, it can be seen that the result for the no overflow case is given by bits 46 to 23. However, bit 47 is latched, since it is used in stage N4 to determine whether it is appropriate to select as the output the overflow result or the no overflow result. Further, bit 22 (i.e. the guard bit) is latched since this is also required in stage N4 to determine whether any correction to the least significant bit is required.

As shown in FIG. 2, a multiplexer 160 is provided to select the final n-bit significand result using either the bits stored within the register 140 (in the case that the overflow condition is determined to exist) or the bits in the register 150 (in the case that the overflow condition is determined not to exist). More details of the selection performed in stage N4 will be described later with reference to FIG. 4. In practice, the multiplexer 160 outputs the 23-bit fraction result (i.e. n−1 bits) rather than the 24-bit significand result, since the most significant bit of the significand is known to be a logic 1 value.

Path 165 is provided to enable special values to be input to the multiplexer 160, such as may be appropriate, for example, if at the time the input operands are evaluated a special case is detected, for example a NaN (Not-a-Number), infinities, and zeros.

The processing logic used to handle the generation of the exponent value for the product can be arranged in a standard way. However, increment logic is also provided in the exponent generation path such that, if the final n-bit significand result is selected from the bits stored within the register 140 (i.e. the overflow condition is determined to exist), then the determined exponent value is incremented by one.

Figure 3:
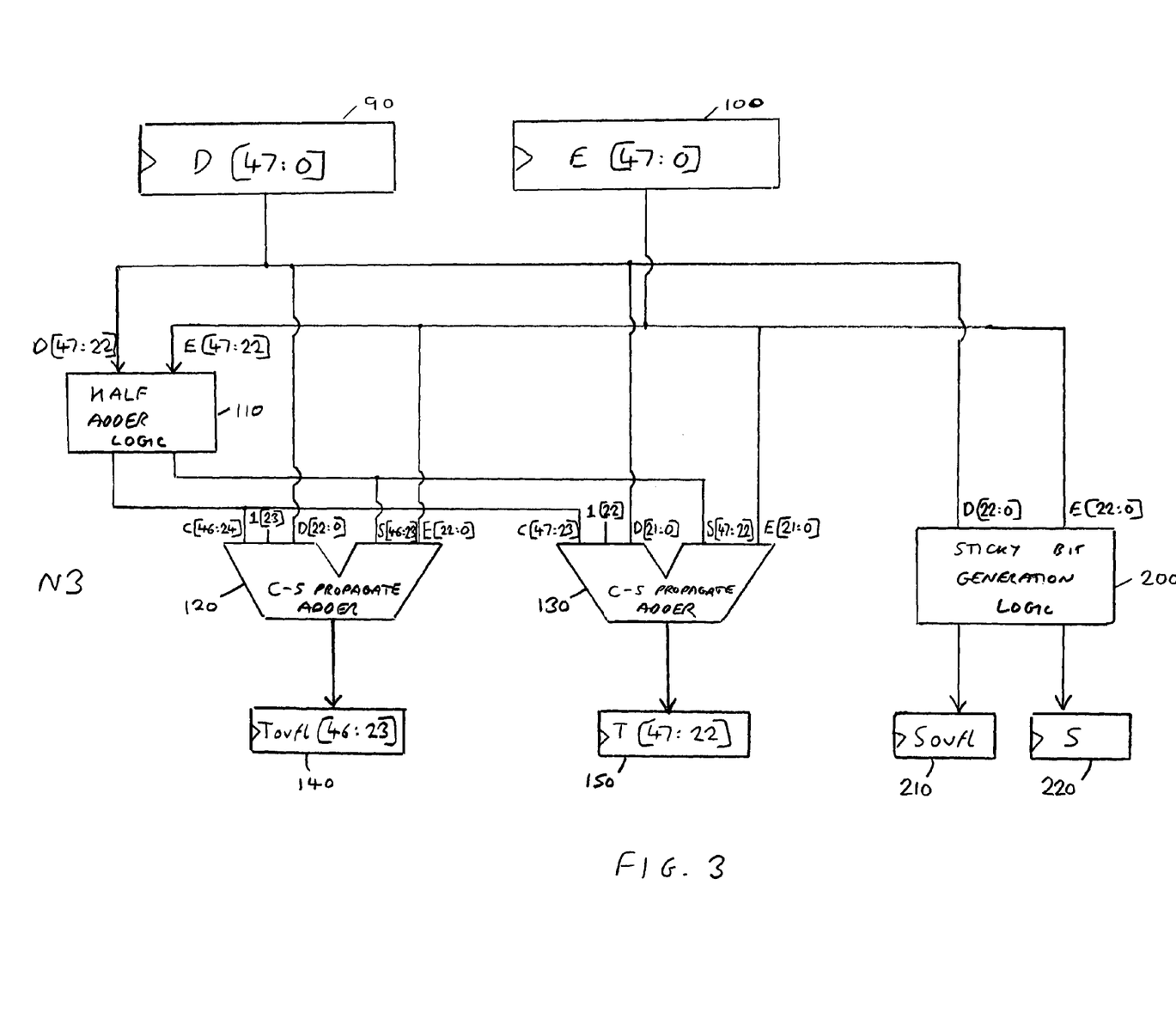
FIG. 3 is a block diagram illustrating in more detail the routing of bits between the various pieces of logic provided in stage N3 of FIG. 2.

Before discussing the logic of FIG. 3, the following background is provided concerning the operation of an n-bit half adder and the manner in which the half adder operations can be performed to enable a rounding bit to be readily incorporated at the stage that the redundant products are summed.

An n-bit half adder consists of n independent half adders. It takes two n-bit two's complement numbers as inputs, and produces two outputs: an n-bit sum and an n-bit carry. Let $X=x_{n-1}, \ldots x_1 x_0$, and $Y=y_{n-1} \ldots y_1 y_0$ be n-bit words with low order bits $x_0$ and $y_0$. An n-bit half adder produces a carry word $C=c_{n-1} \ldots c_1 0$ and a sum word $S=s_{n-1} \ldots s_1 s_0$ such that:

$$c_i = x_{i-1} \text{ AND } y_{i-1} \quad (1)$$

$$s_i = x_i \text{ XOR } y_i \quad (2)$$

Note that $c_0$ is always 0, and that $C+S=X+Y$ (modulo $2^n$).

By definition, (C,S) is in n-bit half-adder form (also referred to as n-bit h-a form) if there exist n-bit X and Y satisfying equations 1 and 2. We write (C,S)=ha(X,Y), and the modifier "n-bit" can be omitted unless it is necessary for clarity.

Theorem 1 Let (C,S) be a number in h-a form. Then it can be proved that the situation where S=−1 means that C+S=−1.
Proof

[⇒] (C,S) is in h-a form, so there exist X and Y such that X+Y=−1 and (C,S)=ha(X,Y). By the definition of a two's complement number, X+Y=−1 means that $Y=\overline{X}$. Then by equation 2, $S=X \text{ XOR } \overline{X}=-1$.

[⇐] By the definition of h-a from (see equations (1) and (2) above), only one of $c_i$ and $s_{i-1}$ can be set for i=1, . . . , n−1, so C=0, and C+S=−1.

The above Theorem 1 was discussed in the paper "Early Zero Detection" by D Lutz et al, Proceedings of the 1996 International Conference on Computer Design, pages 545 to 550. However, it was only discussed in the context of integer arithmetic.

Theorem 2 (Sticky Bit Detection) Let X and Y be n-bit numbers, and let $(C,S)=ha(ha(\overline{X},\overline{Y})+1)$. Then X+Y=0⇔S=−1.

$$X+Y=1 \Leftrightarrow -X-Y-1=-1$$

$$\Leftrightarrow \overline{X}+1+\overline{Y}+1-1=-1$$

$$\Leftrightarrow \overline{X}+\overline{Y}+1=-1$$

An efficient way to compute $\overline{X}+\overline{Y}+1$ is to add $\overline{X}$ and $\overline{Y}$ with a half-adder. Bit zero of the resulting carry word will be zero, so 1 can be readily added by setting that bit zero to one. The result is then not in half-adder form, so the result is passed through a second half adder, producing (C,S). Then by theorem 1, a check as to whether C+S=−1 can be performed by testing whether S=−1.

In practice, theorem 2 is only applied to the bottom k and k+1 bits of X and Y. The half-adders are applied to the bottom k+1 bits, and then k and k+1 input ANDs of the low order bits of S are computed.

As seen in the previous proof, the half-adder form gives an easy way to add one to a sum because of the fact that $c_0=0$. A serendipitous extension of this fact is that given a sum in both its original and half-adder forms, $2^k$ can be added to the sum just as easily. This allows a rounding constant $2^k$ to be added at any of several bit positions at no cost.

Theorem 3 (Rounding) Let X and Y be n-bit numbers, and let (C,S)=ha(X,Y). Then for any k<n−1, $$X+Y+2^k=C[n-1, k+1]1X[k-1,0]+S[n-1,k]Y[k-1,0]$$

Proof: The 1 at position k on the right hand side of the equation adds $2^k$, so it suffices to show that X+Y=C[n−1,k+1]0X[k−1,0]+S[n−1,k]Y[k−1,0]. Clearly the low order k bits are identical, since they are the unchanged X and Y inputs. The sum of the upper n-k bits are equal (module $2^n$) by the definition of half-adder form.

Computations on floating point numbers are required in a variety of applications. Once such application is in the processing of graphics data, and with the migration of graphics applications to more and more handheld wireless devices, the need for providing floating point processing capability within such devices in an efficient manner is becoming a significant issue. As will be appreciated by those skilled in the art, a standard called the "IEEE Standard for Binary Floating-Point Arithmetic", ANSI-IEEE Std 754-1985, The Institute of Electrical and Electronic Engineers, Inc., New York, N.Y. 10017 (hereafter referred to as the IEEE 754-1985 Standard) defines certain requirements for the handling of floating point numbers, and identifies a number of possible rounding modes. However, it has been found that the requirements for processing graphics data are significantly less restrictive than those of the IEEE 754-1985 Standard. In particular the range and precision available in the single precision data type and the round-to-nearest rounding mode are suitable for most graphics processing computations.

In accordance with the round-to-nearest rounding mode, also referred to as the "Round-to-Nearest-Even" (RNE) rounding mode, values that are more than half way between two representable results are rounded up, whilst values that are less than half way between two representable results are rounded down (or truncated). Values that are exactly half way between two representable results are rounded to a final result that has a least significant fraction bit equal to zero, thus making the result even.

In the embodiment of the invention discussed herein, the multiplication logic is arranged to operate on single precision operands, and to round the results according to the RNE rounding mode.

As discussed earlier with reference to FIG. 2, the unrounded result is given by D+E, and the point at which rounding is performed is determined by the location of the high order bit of D+E, which will be at bit position 46 for the no overflow case or bit position 47 for the overflow case. To perform rounding, a logic one value is added at the guard bit position, which is bit 22 for the no overflow case and bit 23 for the overflow case.

The injection of the required rounding increment values at bits 22 and 23 could be achieved by using full adders at bit positions 22 and 23, and half adders for bits 24 through 47, but the delay taken by the presence of the full adders at bit position 22 and bit position 23 would be unacceptable having regard to the timing requirements of the data processing apparatus. However, by taking advantage of the earlier described theorem 3, the apparatus of one embodiment of the present invention is able to use only half adders for the processing of bits 22 through 47, whilst still enabling the required rounding increment bits to be injected at bit positions 22 and 23. This will be discussed in more detail with reference to FIG. 3.

As shown in FIG. 3, the two 48-bit vectors D and E are stored in the registers 90 and 100, and bits 47 to 22 of D and E are provided as inputs to the half adder logic 110. This causes the half adder logic 110 to output carry and sum vectors C and S for bits 47 to 22, which are selectively used by the carry-propagate adders 120, 130 in combination with bits of the original partial products D and E when performing their addition processing.

The original sum is D+E, where:

$$D=d_{47}d_{46}\ldots d_{23}d_{22}d_{21}d_{20}\ldots d_1d_0$$

$$E=e_{47}e_{46}\ldots e_{23}e_{22}e_{21}e_{20}\ldots e_1e_0$$

The modified (no overflow) sum is $C_{no\_ovfl}+S_{no\_ovfl}$, where $$C_{no\_ovfl}=c_{47}c_{46}\ldots c_{23}0d_{21}d_{20}\ldots d_1d_0$$

$$S_{no\_ovfl}=s_{47}s_{46}\ldots s_{23}s_{22}e_{21}e_{20}\ldots e_1e_0$$

Given the earlier discussion of the half adder form, it will be appreciated that $c_{22}$ is in fact equal to zero. If a logic one value is inserted in place of the zero at position 22 in the above no overflow sum, then this will cause the output from the carry propagate adder 130 to represent the rounded result for the no overflow case. As shown in FIG. 3, this is achieved by forcing a logic one value into bit 22 of the first input value received by the carry propagate adder 130 with bits 47 to 23 of that input being provided by the corresponding carry bits produced by the half adder logic 110, and the remaining bits 21 to 0 being provided by the corresponding bits of the partial product D. With regard to the other input to the carry propagate adder 130, this is provided by the sum bits 47 to 22, with the remaining bits 21 to 0 being provided by the original bits of the partial product E.

Furthermore, by applying theorem 3, it is also possible to set up the sum for the overflow case. In particular, the overflow sum is $C_{ovfl}+S_{ovfl}$, where:

$$C_{ovfl}=c_{47}c_{46}\ldots c_{24}0d_{22}d_{21}\ldots d_1d_0$$

$$S_{ovfl}=s_{47}s_{46}\ldots s_{24}s_{23}e_{22}e_{21}\ldots e_1e_0$$

Again, due to the properties of the half adder form, the value of $c_{23}$ is zero, and hence if one is inserted in place of the zero at position 23 in the overflow sum, then this will produce a rounded result for the overflow case. It should be noted that all of the bits needed for the overflow sum have already been computed by the half adder logic 110 and accordingly the carry propagate adder 120 can be readily arranged to perform the necessary summation. In particular, as shown in FIG. 3, the first input to the carry propagate adder 120 receives a logic one value at bit 23, whilst bits 46 to 24 are provided by the carry output from the half adder logic 110 and bits 22 to 0 are provided by the original bits of partial product D. The second input of the carry propagate adder 120 receives bits 46 to 23 from the sum output of the half adder logic 110, whilst bits 22 to 0 are provided by the original bits of the partial product E.

It should be noted that the carry propagate adder 120 could also have received bits 47 of the carry and sum output from the half adder logic 110, but this is unnecessary due to the fact that the result produced by the carry propagate adder 120 will only be used in the event that the overflow condition is detected, and if the overflow condition exists then it is known that the most significant bit of the result (i.e. bit 47) will be a logic one value.

Sticky bit generation logic 200 is provided for performing a logical OR operation on all bits to the right of the guard bit position, which will be bits 21 to 0 for the no overflow result and bits 22 to 0 for the overflow result. Typically, the sticky bit determination is performed using the relevant bits of the final result, but this would have an adverse impact on the speed of operation of the apparatus, and could present a significant timing problem. However, in embodiments of the present invention, by applying the earlier described theorem 2, the sticky bit generation logic 200 is arranged to perform the required evaluation of the sticky bit for both the non-overflow and the overflow case using the lower 22 and 23 bits of D and E. In particular, the logic provided within the sticky bit generation logic 200 in accordance with one embodiment of the present invention will be described further with reference to FIG. 5.

Figure 5:
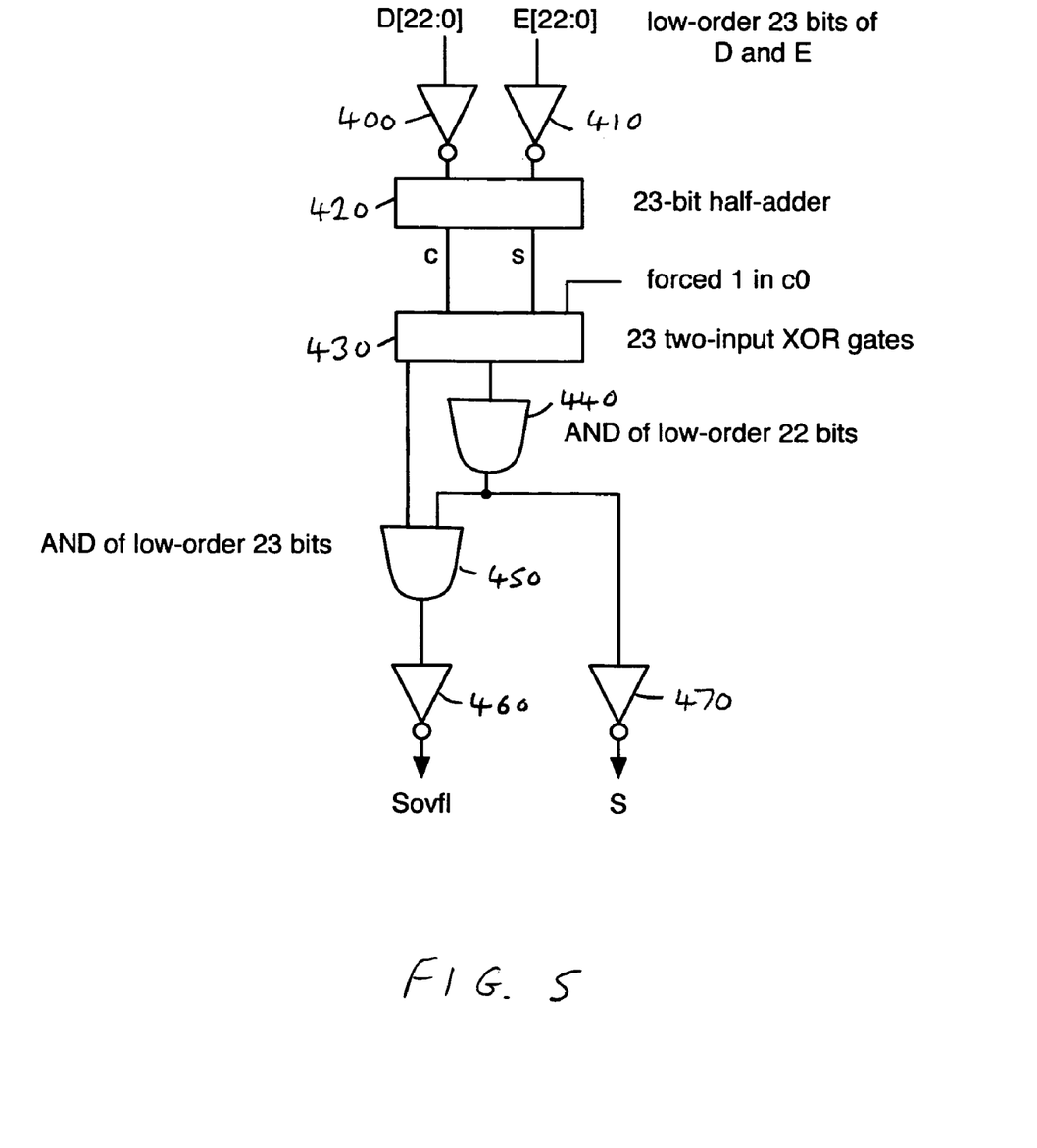
FIG. 5 is a block diagram illustrating the logic provided within the sticky bit generation logic of FIG. 3 in accordance with one embodiment of the present invention.

As discussed with reference to the earlier theorem 2, if the relevant low order bits of D and E are all zero, this can be determined by passing the inverted lower order bits of D and E through a half adder, adding one to bit zero, and then re-passing the data through a half adder to produce carry and sum bits in half adder form. If the resultant sum value is equal to −1, this will indicate that the input lower order bits of D and E are zero, and that accordingly the sticky bit should be set to zero. In all other cases, the sticky bit should be set to one.

This processing is performed in FIG. 5 by inverting bits 22 to 0 of D and E using respective inverters 400 and 410, whereafter the output from both inverters is passed through a 23-bit half adder logic 420. A logic one value is then injected into the least significant bit of the carry value, which results in the carry and sum values no longer being in half-adder form. To correct this, the data could be passed through another 23-bit half adder. However, given that the only check that subsequently needs to be performed is a check as to whether the sum value is equal to −1, the carry value is no longer of interest. Accordingly, the required sum value can be produced using the 23 two-input XOR gates 430. If the resultant sum value is −1, this will be indicated in twos complement form by all bits being set equal to one. Accordingly, AND gate 440 performs a logical AND operation of the low order 22 bits (i.e. bits 21 to 0) which will only produce an output logic one value if all input bits are set to one. The output from the AND gate 440 is then inverted by the inverter 470 in order to produce the sticky value appropriate for the no overflow condition. It will be appreciated that the sticky value will have a logic zero value if the sum value was equal to −1 (i.e. bits 21 to 0 of both D and E were all zeros), but otherwise will have a logic one value.

For the overflow evaluation, the output from the AND gate 440 is routed to AND gate 450, which also receives the most significant bit of the sum value produced by the XOR gate logic 430. The output from the AND gate 450 is inverted by the inverter 460 in order to produce the sticky bit value for the overflow condition. It can hence be seen that the sticky bit for the overflow condition will only be set to zero if the sum value is all ones, indicating that bits 22 to 0 of D and E are all zero, whereas in all other instances the sticky bit will be set to one. As shown in FIG. 3, the two sticky bits are stored in registers 210 and 220, respectively, at the end of stage N3.

Figure 4:
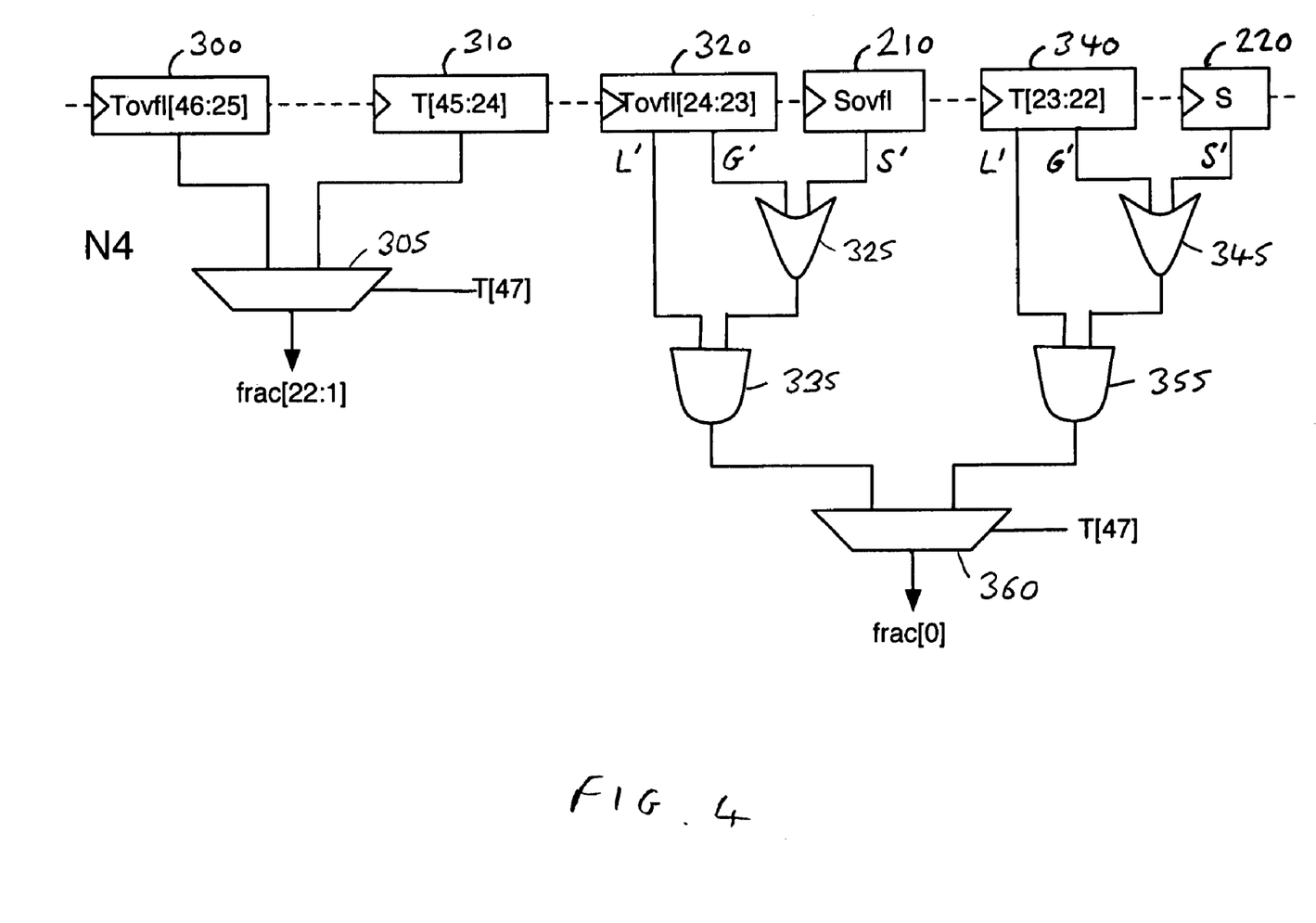
FIG. 4 is a block diagram illustrating in more detail the processing performed in stage N4 in order to produce the fraction component of the n-bit result in accordance with one embodiment of the present invention.

FIG. 4 illustrates the logic provided in stage N4 to make the final selection of the 23 fraction bits of the result dependent on whether the overflow condition exists or not, and also illustrates logic provided to perform any necessary correction of the least significant bits of the result due to incorrect rounding. As will be appreciated from the earlier described FIG. 1, the presence of the overflow condition can be determined by looking at bit 47 of the result produced by the carry propagate adder 130. Bit 47 from register 150 is hence used as a select signal for multiplexers 305 and 360. Multiplexer 305 receives bits 46 to 25 of the overflow result produced by the carry propagate adder 120 which in the event of the overflow condition will represent bits 22 to 1 of the final result, and similarly the multiplexer 305 receives at its other inputs bits 45 to 24 of the non-overflow result produced by the carry propagate adder 130, which again will represent the fraction bits 22 to 1 of the final result for the no overflow condition.

It has been found that the rounded results produced by the carry propagate adders 120 and 130 produced using a forced injection of a logic one value at the guard position will be correctly rounded having regard to the RNE rounding mode, with the possible exception of the least significant bit, which in one particular situation may be incorrect. This will be illustrated with reference to the following Table 2:

TABLE 2

|   | L | G | S | R | LT | L' | G' | S' |
|---|---|---|---|---|----|----|----|----|
| a | 0 | 0 | 0 | 0 | 0  | 0  | 1  | 0  |
| b | 0 | 0 | 1 | 0 | 0  | 0  | 1  | 1  |
| c | 0 | 1 | 0 | 0 | 0  | 1  | 0  | 0  |
| d | 0 | 1 | 1 | 1 | 1  | 1  | 0  | 1  |
| e | 1 | 0 | 0 | 0 | 1  | 1  | 1  | 0  |
| f | 1 | 0 | 1 | 0 | 1  | 1  | 1  | 1  |
| g | 1 | 1 | 0 | 1 | 0  | 0  | 0  | 0  |
| h | 1 | 1 | 1 | 1 | 0  | 0  | 0  | 1  |

The values L (least significant bit of result), G (guard bit, i.e. first bit not in the result), and S (sticky bit, which is the OR of all remaining bits not in the result) are the values that would exist prior to any rounding increment being introduced. The values L', G' and S' are the corresponding values of those bits present at the output of the carry propagate adders 120, 130, due to the insertion of a logic one value at the guard position. The R value indicates whether a rounding is in fact required, having regard to the RNE rounding mode, a logic one value indicating that a rounding should take place and a logic zero value indicating that no rounding is required. The value of R is obtained by the following computation:

(L AND G) OR (G AND S)

The value LT in the table hence indicates the new least significant bit value that would result from the required rounding indicated by the R bit. If the LT value is then compared with the corresponding L' value, i.e. the actual least significant bit value output by the carry propagate adders 120, 130, then it can be seen that these differ only in row c, and accordingly this is the only situation where any corrective action needs to be taken in stage N4 to account for an incorrect value of the least significant bit. In this situation, the G bit is set and the S bit is clear, hence indicating the "tie case" for the RNE rounding mode, i.e. the situation where the value is exactly half way between two representable values. In this case, the injection of a logic one value at the guard bit position has caused the L' value to be set, but in actual fact the final least significant bit of the result should not be set. However, as shown in row c, the original least significant bit value was zero, and accordingly this error does not propagate past the least significant bit position, and all that is required is to reset the least significant bit position to zero.

This operation is performed by the logic 325, 335, 345 and 355 illustrated in FIG. 4. In particular, for the overflow result, OR gate 325 performs a logical OR operation on the G' and S' values (i.e. bit 23 from register 320 and the $S_{ovfl}$ value from register 210). The output from the OR gate is then input to AND gate 335, which performs an AND operation on that input and the value of L' (i.e. bit 24 from the register 320). In the event that L' is 1, and G' and S' are both 0, i.e. the situation for row c of table 2, this will cause a logic zero value to be input to the multiplexer 360. In all other cases illustrated in table 2, this logic will ensure that the L' value is propagated unchanged.

The OR gate 345 and the AND gate 355 operate in an identical manner for the no overflow case. The selection of the output from the multiplexer 360 is taken in dependence on the value of bit 47 of the no overflow result, i.e. bit 47 stored in register 150.

From the above described embodiment, it can be seen that the data processing apparatus described provides a very efficient technique for multiplying two significands of two floating point operands. In particular, rounding increment values can be injected prior to performing the final addition in the carry propagate adders, with properties of the half adder form being exploited to enable the rounding bit to be injected using only half adders, thereby avoiding the time penalty that would be incurred if full adders were to be used. Furthermore, when employing the RNE rounding mode, it has been found that the obtained results are correct in all situations other than the tie case, and in the tie case the result can be readily corrected merely by resetting the least significant bit of the result to zero.

It will be appreciated that the above described techniques for injecting the rounding increment using a half adder structure prior to performance of the final addition might also be used in situations where other rounding modes are supported, but in such instances different correction logic may be required in stage N4 to correct for any errors introduced into the result as a result of the forced rounding increment.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for multiplying first and second n-bit significands of first and second floating point operands to produce an n-bit result, the data processing apparatus comprising:

multiplier logic circuitry for multiplying the first and second n-bit significands to produce a pair of 2n-bit vectors;

half adder logic circuitry for receiving a plurality of most significant bits of the pair of 2n-bit vectors and to produce a corresponding plurality of carry and sum bits representing said plurality of most significant bits;

first adder logic circuitry for performing a first sum operation in order to generate a first rounded result equivalent to the addition of the pair of 2n-bit vectors with a rounding increment injected at a first predetermined rounding position appropriate for a non-overflow condition, the first adder logic circuitry being arranged to use as the m most significant bits of the pair of 2n-bit vectors the corresponding m carry and sum bits, and to take the remaining 2n-m least significant bits of the pair of 2n-bit vectors directly from the 2n-bit vectors, with the least significant of the m carry bits replaced with a rounding increment value prior to the first adder logic performing the first sum operation, wherein n and m are integers and 2n is greater than m;

second adder logic circuitry for performing a second sum operation in order to generate a second rounded result equivalent to the addition of the pair of 2n-bit vectors with a rounding increment injected at a second predetermined rounding position appropriate for an overflow condition, the second adder logic circuitry being arranged to use as the m−1 most significant bits of the pair of 2n-bit vectors the corresponding m−1 carry and sum bits, and to take the remaining 2n-m+1 least significant bits of the pair of 2n-bit vectors directly from the 2n-bit vectors, with the least significant of the m−1 carry bits replaced with the rounding increment value prior to the second adder logic performing the second sum operation; and selector logic circuitry for deriving the n-bit result from either the first rounded result or the second rounded result.

2. A data processing apparatus as claimed in claim 1, wherein the selector logic includes overflow detection logic operable to detect the presence of the overflow condition with reference to the most significant bit of the first rounded result, if the overflow condition exists the selector logic being operable to derive the n-bit result from the second rounded result, and if the overflow condition does not exist the selector logic being operable to derive the n-bit result from the first rounded result.

3. A data processing apparatus as claimed in claim 1, wherein the n-bit result is required to be rounded in accordance with a round-to-nearest rounding mode, the selector logic including correction logic operable to detect a situation where the n-bit result derived from the first rounded result or the second rounded result does not conform to the round-to-nearest rounding mode and to correct the n-bit result by manipulation of one or more bits of the n-bit result.

4. A data processing apparatus as claimed in claim 1, wherein the first predetermined rounding position is a guard bit position assuming the non-overflow condition exists and the second predetermined rounding position is a guard bit position assuming the overflow condition exists.

5. A data processing apparatus as claimed in claim 1, further comprising sticky bit generation logic operable to determine from a number of least significant bits of the pair of 2n-bit vectors a first sticky value associated with the first rounded result and a second sticky value associated with the second rounded result.

6. A data processing apparatus as claimed in claim 3, further comprising sticky bit generation logic operable to determine from a number of least significant bits of the pair of 2n-bit vectors a first sticky value associated with the first rounded result and a second sticky value associated with the second rounded result, the first and second sticky values being input to the correction logic.

7. A data processing apparatus as claimed in claim 6, wherein the situation where the n-bit result does not conform to the round-to-nearest rounding mode is determined to occur when the least significant bit of the n-bit result is set but the guard bit position of the rounded result from which the n-bit result is derived and the associated sticky value are both not set, upon determination of the occurrence of said situation, the correction logic being operable to cause the least significant bit of the n-bit result to be cleared in order to correct the n-bit result.

8. A data processing apparatus as claimed in claim 1, wherein the first and second floating point operands are single precision floating point operands, n is 24 and m is 26.

9. A data processing apparatus as claimed in claim 1, wherein the second adder logic ignores the most significant carry bit and sum bit when performing the second sum operation.

10. A method of operating a data processing apparatus to multiply first and second n-bit significands of first and second floating point operands to produce an n-bit result, the method comprising the steps of:

multiplying the first and second n-bit significands to produce a pair of 2n-bit vectors;

employing half adder logic circuitry to produce from a plurality of most significant bits of the pair of 2n-bit vectors a corresponding plurality of carry and sum bits representing said plurality of most significant bits;

performing a first sum operation in order to generate a first rounded result equivalent to the addition of the pair of 2n-bit vectors with a rounding increment injected at a first predetermined rounding position appropriate for a non-overflow condition, the first sum operation using as the m most significant bits of the pair of 2n-bit vectors the corresponding m carry and sum bits, and taking the remaining 2n-m least significant bits of the pair of 2n-bit vectors directly from the 2n-bit vectors, with the least significant of the m carry bits replaced with a rounding increment value prior to performing the first sum operation, wherein n and m are integers and 2n is greater than m;

performing a second sum operation in order to generate a second rounded result equivalent to the addition of the pair of 2n-bit vectors with a rounding increment injected at a second predetermined rounding position appropriate for an overflow condition, the second sum operation using as the m−1 most significant bits of the pair of 2n-bit vectors the corresponding m−1 carry and sum bits, and taking the remaining 2n−m+1 least significant bits of the pair of 2n-bit vectors directly from the 2n-bit vectors, with the least significant of the m−1 carry bits replaced with the rounding increment value prior to performing the second sum operation; and deriving the n-bit result from either the first rounded result or the second rounded result.

11. A method as claimed in claim 10, wherein the deriving step comprises the steps of:

detecting the presence of the overflow condition with reference to the most significant bit of the first rounded result;

if the overflow condition exists deriving the n-bit result from the second rounded result; and if the overflow condition does not exist deriving the n-bit result from the first rounded result.

12. A method as claimed in claim 10, wherein the n-bit result is required to be rounded in accordance with a round-to-nearest rounding mode, the deriving step including the steps of:

detecting a situation where the n-bit result derived from the first rounded result or the second rounded result does not conform to the round-to-nearest rounding mode; and upon detection of that situation correcting the n-bit result by manipulation of one or more bits of the n-bit result.

13. A method as claimed in claim 10, wherein the first predetermined rounding position is a guard bit position assuming the non-overflow condition exists and the second predetermined rounding position is a guard bit position assuming the overflow condition exists.

14. A method as claimed in claim 10, further comprising the step of:

determining from a number of least significant bits of the pair of 2n-bit vectors a first sticky value associated with the first rounded result and a second sticky value associated with the second rounded result.

15. A method as claimed in claim 12, further comprising the steps of:

determining from a number of least significant bits of the pair of 2n-bit vectors a first sticky value associated with the first rounded result and a second sticky value associated with the second rounded result;

referencing the first and second sticky values when detecting said situation.

16. A method as claimed in claim 15, wherein the situation where the n-bit result does not conform to the round-to-nearest rounding mode is determined to occur when the least significant bit of the n-bit result is set but the guard bit position of the rounded result from which the n-bit result is derived and the associated sticky value are both not set, upon detection of said situation, the correcting step causing the least significant bit of the n-bit result to be cleared in order to correct the n-bit result.

17. A method as claimed in claim 10, wherein the first and second floating point operands are single precision floating point operands, n is 24 and m is 26.

18. A method as claimed in claim 10, wherein during the step of performing the second sum operation the most significant carry bit and sum bit are ignored.

* * * * *